(12) United States Patent
Piani

(10) Patent No.: US 12,358,738 B2
(45) Date of Patent: Jul. 15, 2025

(54) MACHINE FOR SEPARATING A LOAD SUPPORTED BY A PALLET

(71) Applicant: TOPPY S.R.L., Valsamoggia (IT)

(72) Inventor: Daniele Piani, Monte San Pietro (IT)

(73) Assignee: TOPPY S.R.L., Valsamoggia (IT)

( * ) Notice: Subject to any disclaimer, the term of this patent is extended or adjusted under 35 U.S.C. 154(b) by 0 days.

(21) Appl. No.: 18/607,441

(22) Filed: Mar. 16, 2024

(65) Prior Publication Data

US 2024/0308789 A1    Sep. 19, 2024

(30) Foreign Application Priority Data

Mar. 17, 2023    (IT) .................. 102023000000336

(51) Int. Cl.
  *B65G 61/00*    (2006.01)
  *B65G 7/08*    (2006.01)
  *B65G 39/12*    (2006.01)

(52) U.S. Cl.
  CPC .............. *B65G 61/00* (2013.01); *B65G 7/08* (2013.01); *B65G 39/12* (2013.01);
  (Continued)

(58) Field of Classification Search
  CPC .............................. B65G 61/00; B65G 39/12; B65G 2201/0267; B65H 15/02; B65H 2301/332;
  (Continued)

(56) References Cited

U.S. PATENT DOCUMENTS 2,278,140 A * 3/1942 Sieger ............... B21B 39/002
                                                       414/754
3,418,725 A * 12/1968 Ruud ..................... B65H 31/40
                                                       271/210
(Continued)

FOREIGN PATENT DOCUMENTS

NL        1008203 C2 *    8/1999    ............. B65B 69/00

OTHER PUBLICATIONS

Toppy Pallet Changer: "Pallet changer "L-Shape Tilter 95 degrees" (insert & remove freezer spacers)", Jul. 17, 2020 (Jul. 17, 2020), XP093092744, Retrieved from the Internet: URL:https://www.youtube.com/watch?app=desktop&v=fE9hSdVknAE [retrieved on Oct. 18, 2023], 2 pages.
(Continued)

*Primary Examiner* — Gregory W Adams
(74) *Attorney, Agent, or Firm* — Francis J. Maguire; WARE FRESSOLA MAGUIRE & BARBER LLP

(57) ABSTRACT

A machine for separating a load (C) made up of several superimposed layers of packages (B) and supported by a pallet (P), includes: a base element (3) connected to a housing element (5) that also includes a base member (7) that meets the face of the pallet opposite to the load; a slide wall member (9) in sliding contact with a face of the load, a side wall member (11), and a compacting plane member (13) slidably operated along the side wall member towards and away from the base member. A tilt actuator (15) interconnected between the base element and the housing element is assigned to rotate the housing element around a pivot pin (14) between a first extreme condition wherein the slide wall member is vertical and a second extreme condition wherein the housing member is rotated by an angle of approximately 90° or greater.

20 Claims, 9 Drawing Sheets

(52) U.S. Cl.
CPC ... *B65G 2201/0267* (2013.01); *Y10S 414/106* (2013.01); *Y10S 414/107* (2013.01); *Y10S 414/108* (2013.01)

(58) Field of Classification Search
CPC .... B65H 2301/33214; B65H 2301/422; B65H 3/322; B65H 2301/42242; B65H 2301/4224; Y10S 414/106; Y10S 414/108; Y10S 414/107
USPC ...... 414/778, 789.2, 789.8, 796, 796.1, 799, 414/927, 928, 929
See application file for complete search history.

(56) References Cited

U.S. PATENT DOCUMENTS

| | | | | |
|---|---|---|---|---|
| 4,082,174 | A * | 4/1978 | Stobb | B65H 31/3081 198/368 |
| 4,338,055 | A * | 7/1982 | Petersson | B65G 57/00 414/789.5 |
| 4,613,268 | A * | 9/1986 | Capdeboscq | B65H 15/016 414/796 |
| 4,696,614 | A * | 9/1987 | Moen | B65G 1/00 414/789.2 |
| 5,567,102 | A * | 10/1996 | Tanaka | B65G 57/00 414/796.4 |
| 9,150,394 | B2 * | 10/2015 | Fourney | B66F 7/0666 |
| 10,023,405 | B2 * | 7/2018 | Kim | B65G 47/40 |
| 11,078,039 | B2 * | 8/2021 | Andersson | B65H 15/02 |
| 2006/0104803 | A1 * | 5/2006 | Wanninger | B65G 1/00 414/814 |

OTHER PUBLICATIONS

Airflow Spacers Ltd: "Airflow SR2.wmv", Jun. 10, 2013 (Jun. 10, 2013), XP093092737, Retrieved from the Internet: URL:https://www.youtube.com/watch?v=-pvmrMAQy_A [retrieved on Oct. 18, 2023), 2 pages.

Search Report and Written Opinion for Italian Patent Application No. 202300000336 (see the English translation of the original ten claims that appear in the priority document itself), completed Oct. 18, 2023, 7 pages.

* cited by examiner

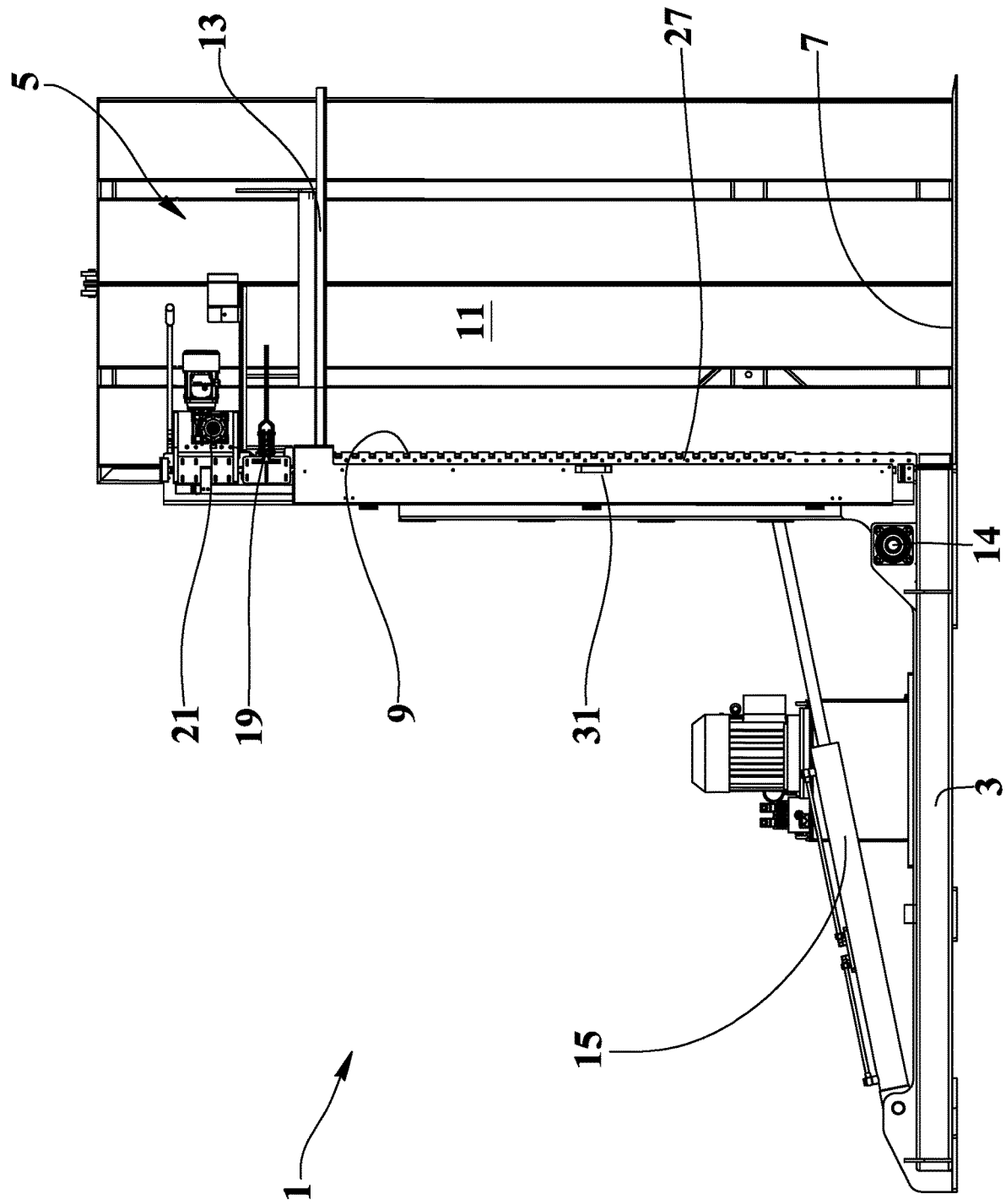

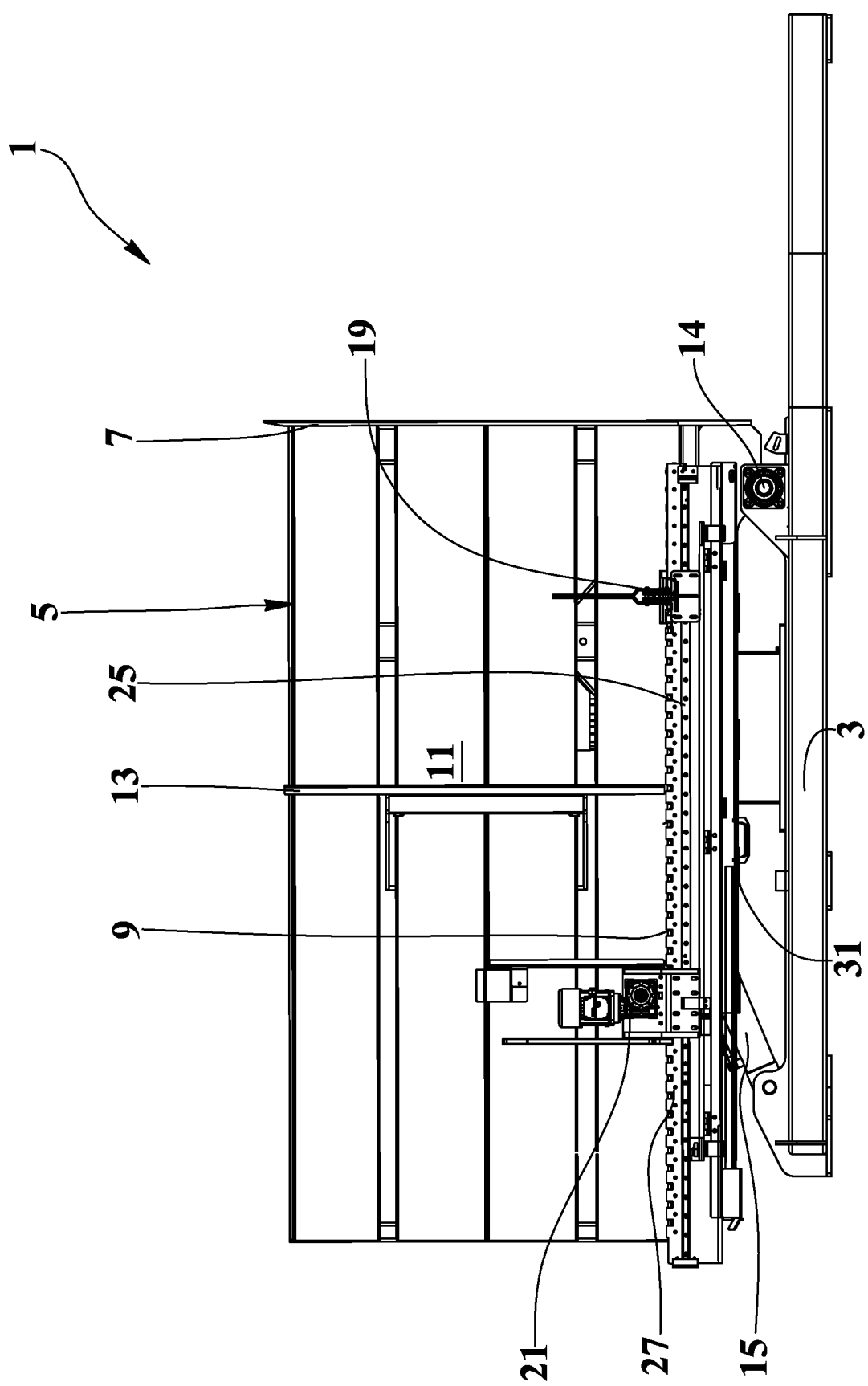

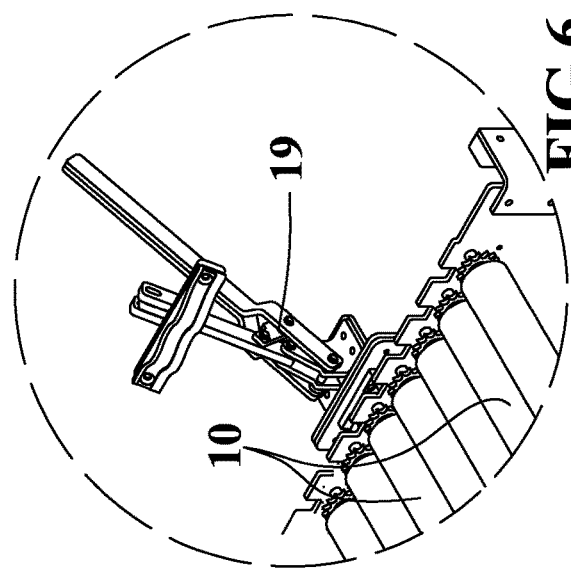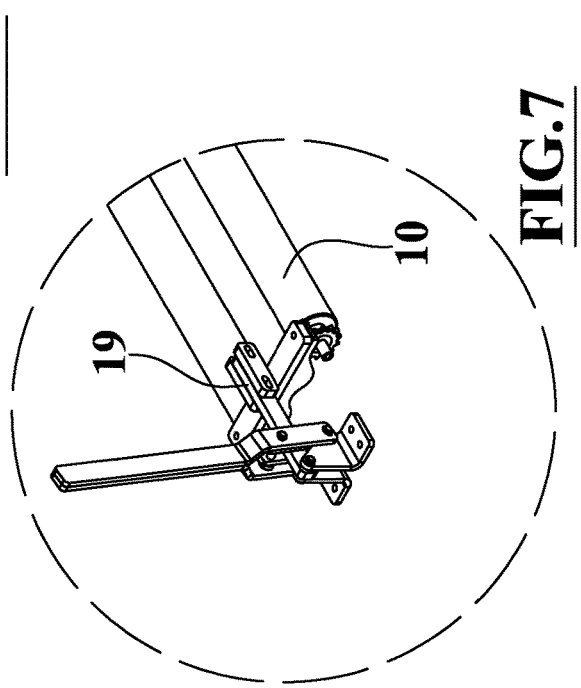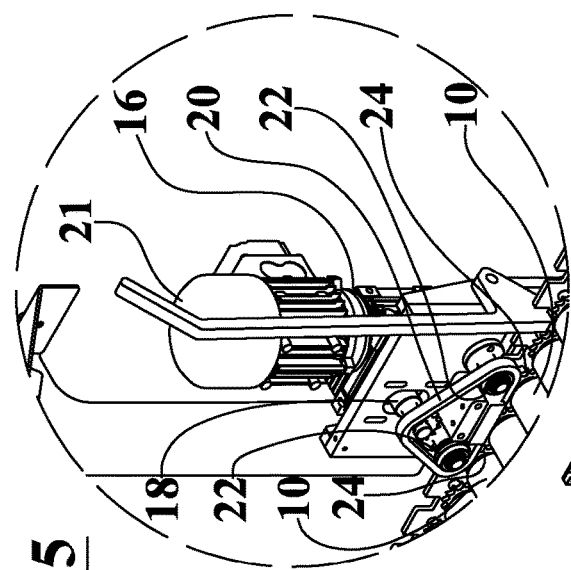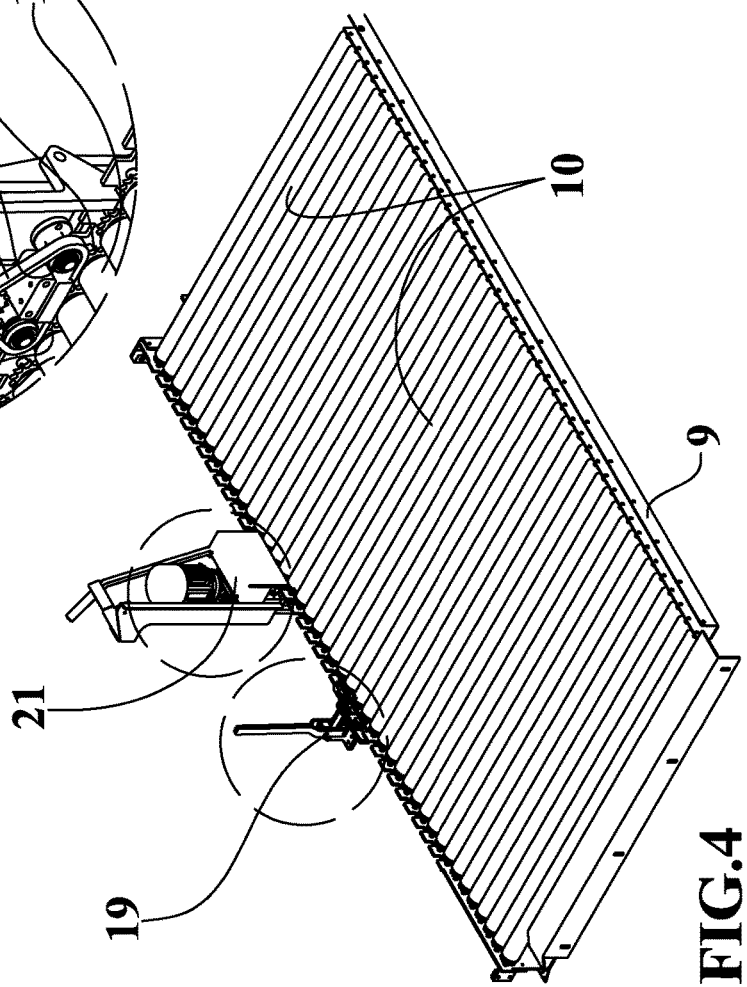

MACHINE FOR SEPARATING A LOAD SUPPORTED BY A PALLET

BACKGROUND OF THE INVENTION

The present invention relates to the field concerning logistics and management of boxes and packages generally assembled to form a load supported by a pallet, or the like, and in particular it refers to a machine for separating a load supported by a pallet.

In warehouses, depots, and logistic centers there is a need to distribute the packages of the load supported by a pallet onto multiple pallets. For example, a pallet with a load made up of twelve superimposed layers of packages may be too high or difficult to manage or to store or to insert into a container and therefore it may be necessary to take nine layers of packages and distribute them equally on three further pallets obtaining a total of four pallets each with three layers of packages. Such type of operation is generally carried out, in a known way, by hand lifting the packages and appropriately placing them on further pallets whose loads may be the same or different.

A disadvantage of such known method of separating a load is that it requires expensive manpower.

Another disadvantage consists in the fact that the manual operation, even if possibly facilitated by mechanical lifting aids, is not free from risks for the operators who may suffer injuries or wounds, for example in the event of falling packages, and for the packages themselves which can be damaged.

BRIEF SUMMARY OF THE INVENTION

A purpose of the present invention is to propose a machine for separating a load supported by a pallet and/or to allow the load to be separated to place one or more pallets between two or more separated portions of said load.

Another purpose is to propose a machine with a totally motorized drive or a partially gravitational drive.

A further purpose is to propose a relatively simple and economical machine that is reliable and capable of reducing the risks of injuries and damages to people and things.

BRIEF DESCRIPTION OF THE DRAWINGS

The characteristics of the invention are highlighted below with reference to the attached drawings in which:

FIG. 2 and FIG. 3 illustrate side views of the machine of FIG. 1 in respective conditions;

FIG. 4. illustrates an axonometric view of some interconnected details of FIG. 1;

FIG. 5 illustrates an enlarged view of a detail of FIG. 4;

FIG. 6 and FIG. 7 illustrate an enlarged view of a further detail of FIG. 4 in respective operating conditions;

FIGS. 14-20 illustrate schematic views of the machine in FIG. 1 associated with a load consisting of several layers of packages and with one or two pallets in a second possible operating sequence in which the movement of some layers of packages are operated by motorized means.

DETAILED DESCRIPTION

Figure 1:
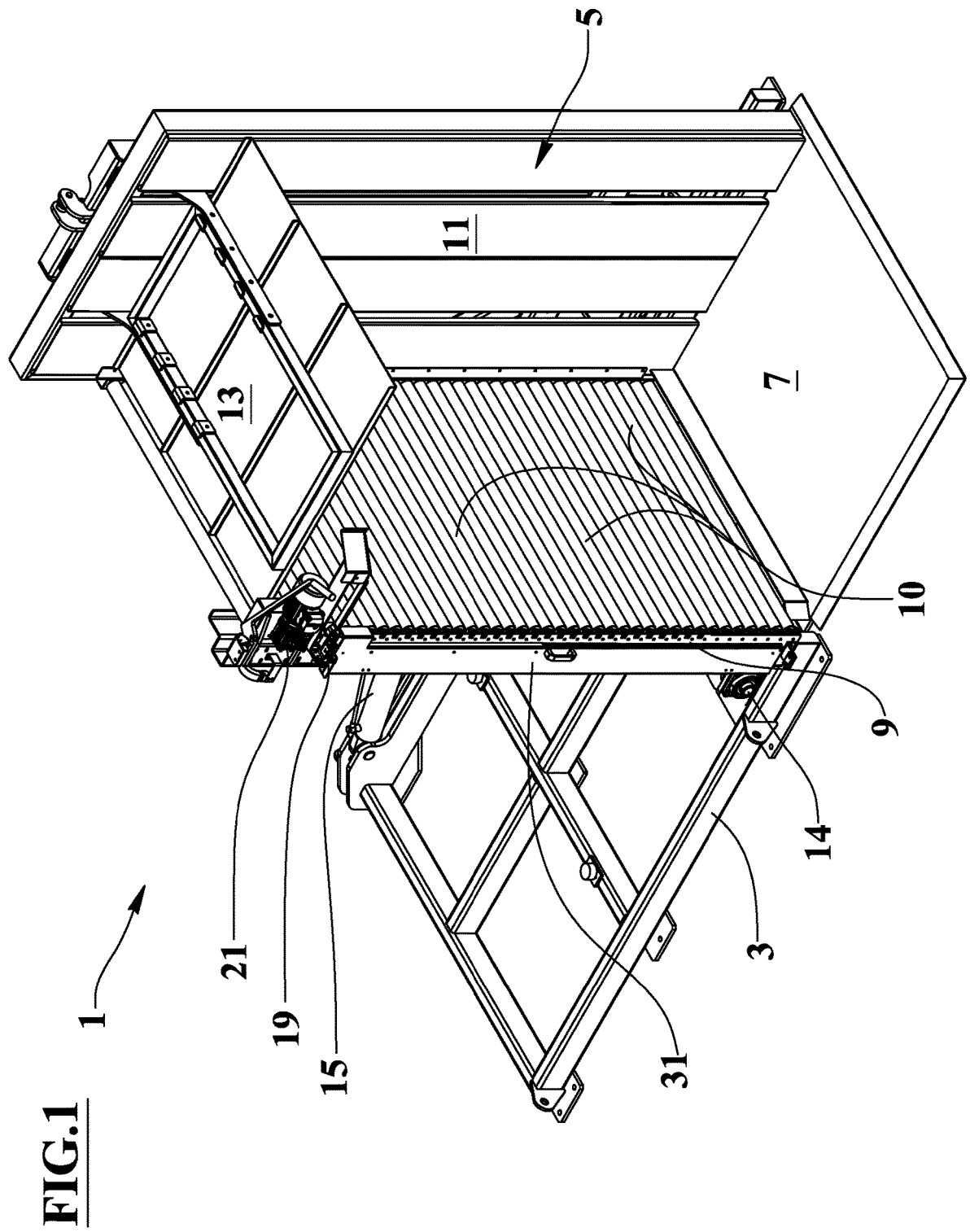
FIG. 1 illustrates an axonometric view of the machine for separating a load supported by a pallet which is the object of the present invention.

With reference to FIGS. 1-7. numeral 1 indicates the machine for separating a load C consisting of several superimposed layers of packages B and supported by a pallet P, object of the present invention.

The machine 1 comprises at least:
- a base element 3 assigned to be placed on, or fixed to, a floor, a surface or a wall;
- a base member 7 defining a respective plane assigned to meet with the face of the pallet P opposite to the load C;
- a slide wall member 9 provided with a set of rolling elements 10, comprising at least one between rollers, wheels, discs, belts and the like, with respective rotation axes perpendicular to the sliding direction and parallel to the pivot pin 14; the rolling elements 10 define a respective tangent geometric plane assigned to match in a slidable way with a lateral face of the load C of the pallet P; where such sliding direction and plane are perpendicular to the base member 7;
- a pivot pin 14 perpendicular to said sliding direction, parallel to the base member 7 and slide wall member 9 and placed between them 7, 9 and the base element 3 for the rotation of said base member 7 and slide wall member 9;
- a tilt actuator 15 interconnected between the base element 3 and said base member 7 and slide wall member 9.

The machine 1 is provided with at least a rotation member 21 or with at least one optional stop member 19 or with both.

The at least a rotation member 21 is associated with the slide wall 9 and it is provided with at least one motor or at least one gearmotor for the motorized rotation of at least one subset of the rolling elements.

The least one optional stop member 19 can block and release a corresponding subset of rolling elements 10.

The machine can perform the separation of the layers of the load C in all cases:
- if provided with a rotation member 21;
- if provided with a stop member 19;
- if provided with both.

The tilt actuator 15 is assigned to rotate and tilt the base member 7 together with the slide wall member 9 around the pivot pin 14 between a first extreme condition in which the base member 7 and the slide wall member 9 are respectively horizontal and vertical and a second extreme condition in which such elements are rotated by an angle equal to approximately 90° or greater, and in which, in particular, the slide wall member 9 is horizontal or inclined downwards in the opposite direction to the pivot pin 14. It is also provided that the rotation can be slightly less than 90° to prevent the load from moving away, due to gravity, from the base member 7, for instance when the stop member 19 is not adopted.

The rotation member 21 is assigned to move part of the load away from the base member 7 and from the pallet respectively to create a space between the predetermined load layers to insert a load subdivision pallet.

It is optionally provided that the rotation member 21 can move the entire load, away from the base member 7 and from the pallet, possibly to remove the original pallet and possibly to replace it with another; the base member 7 can be eventually provided with optional hooks or clamps to block and to release the pallet.

In such embodiments, the machine 1, in addition to the base element 3, the base member 7, the slide wall 9, the set of rolling elements 10, the pivot pin 14, the tilt actuator 15 and at least one between the rotation member 21 and the stop member 19, comprises:

- a side wall member 11, for example of an almost flat rectangular shape or made up of coplanar longitudinal elements, having dimensions equal to, or greater than, the maximum dimensions of a face, such as the smaller one, of the assembly consisting of each pallet P with the respective load C and such side wall member 11 is assigned to meet with, or to be adjacent to, such lateral face of the load C of the pallet P;
- a compacting plane member 13 slidably operated along the side wall member 11 towards and away from the base member 7 to which it is parallel;
- a housing element 5 connected to the base element 3 and delimited by the latter 3, by the slide wall 9, by the side wall member 11 and by the compacting plane member 13 where such housing element 5 assigned to house the pallet P with the load C to be divided.

The base element 3, for example, can be of the frame or truss type made of steel beams and of a predominantly two-dimensional shape and it 3 is provided with attachments or fixings for blocking such base element to a horizontal or almost horizontal floor or plane or to a wall. The base element 3 is also provided with, or connected to, seats or supports for the pivot pin 14.

The base member 7, for example, can comprise a rectangular platform having dimensions approximately equal to or slightly greater than the maximum dimensions of the footprint of the biggest possible pallets P in use and it 7 is assigned to meet with the face of the pallet P opposite to the load C.

The slide wall member 9, for example, can be of an almost flat rectangular shape having dimensions equal to or greater than the maximum dimensions of a face, such as the largest one possible in use, of the assembly consisting of each pallet P with the respective load C.

This slide wall member 9 is assigned to abut with a lateral face of the load C of the pallet P where this abutment is slidable or movable to allow the translation of at least a portion of the load C.

Preferably the rolling elements 10 are made up of rollers which, as seen previously, are parallel to the pivot pin 14 and tangential to the defined plane. As clarified below, adjacent subsets or groups, for example of one or more rollers 10, preferably of three rollers 10, can be selectively driven by the rotation member 21, or each of them 10 is driven, individually or in groups, by respective motors of the rotation member 21.

If the machine 1 does not comprise the rotation member 21, the rolling elements 10 are idle and free to rotate, while the stop member 19 can block a subset thereof.

The base member 7, the slide wall member 9 and the side wall member 11 define respective mutually perpendicular geometric planes and are preferably mutually fixed to a frame or structure which also carries seats or housings for the pivot pin 14.

An edge of the housing element 5 adjacent to corresponding sides of the base member 7 and of the slide wall member 9 is connected to the base member 3 by means of the pivot pin 14 parallel to such base 7 and slide wall 9 members.

The tilt actuator 15, for example consisting of a linear actuator of the electric type or of the hydraulic type with respective pump, or of another type, can have the ends swivelling connected respectively to the base element 3 and to the frame or to the fixing structure of the base 7, slide wall 9, side wall 11 members or to one of these three latter 7, 9, 11.

In this way the operation of the tilt actuator 15 causes the rotation of the entire housing element 5 around the pivot pin 14 between the first extreme condition in which at least the slide wall member 9 and the base member 7 are respectively vertical and horizontal and the second extreme condition in which the housing element 5 is rotated by an angle between approximately 80° and 90°, preferably by approximately 90°, or by an angle greater than 90°, compared to the first extreme condition. The stopping of the sliding of the load, and its compaction with the load subdivision pallet, can be carried out by the compacting plane member 13 and therefore a specific rotation condition of the housing element 5 at an angle slightly less than 90° is not necessary because the compacting plane member 13 stops the load, even if the machine is not provided with the stop member 19.

In these second extreme conditions of rotation at 90° or rotation greater than 90°, the slide wall member 9 is respectively horizontal or inclined downwards in the direction opposite to the pivot pin 14.

In order to operate the rotation of any subset of the rolling means 10, consisting of rollers or the like, the rotation member 21 is movable and lockable along one side of the slide wall member 9. For this purpose, the machine 1 is provided with at least one rail member 25 and at least one rack member 27 parallel and adjacent to or fixed to a side perpendicular to the pivot pin 14 of the slide wall member 9 and the rotation member 21 is slidably movable along the rail member 25 and it 21 is provided with a respective blocking lever that can be operated to disengage and engage, with its own tooth, one of the recesses of the rack member 27 to release and block the sliding of the rotation member 21 itself by engaging it with a corresponding subset of rolling elements 10.

Alternatively, the positioning of the rotation member 21 along the slide wall 9 can be achieved by means of guide and/or motorized rack and pinion and/or motorized male and female screw actuators or by means of other linear actuators.

The position of the rotation member 21 along the side of the slide wall member 9 determines which rollers are connected to the rotation member 21 itself.

The rotation member 21 is provided with a motor or gearmotor 16 having a drive pinion 18 for an annular belt or chain 20 engaged on respective free tensioning pinions 22 and on rotation pinions 24 of two or more adjacent rollers 10 of the slide wall 9.

In this case the rollers 10, when not engaged by the possible rotation member 21 or by the possible stop member 19, are idle.

Obviously, the transmission of the rotary motion of the rotation member 21 to the subset of rolling elements can be achieved by means of other transmissions.

Alternatively, the rolling elements 10 of the slide wall 9 may consist of rollers each of which, or each subset of which, is provided with a motor or gearmotor of the rotation member 21 to drive its rotation where such motors or gearmotors can be operated individually or in groups.

Figure 8:
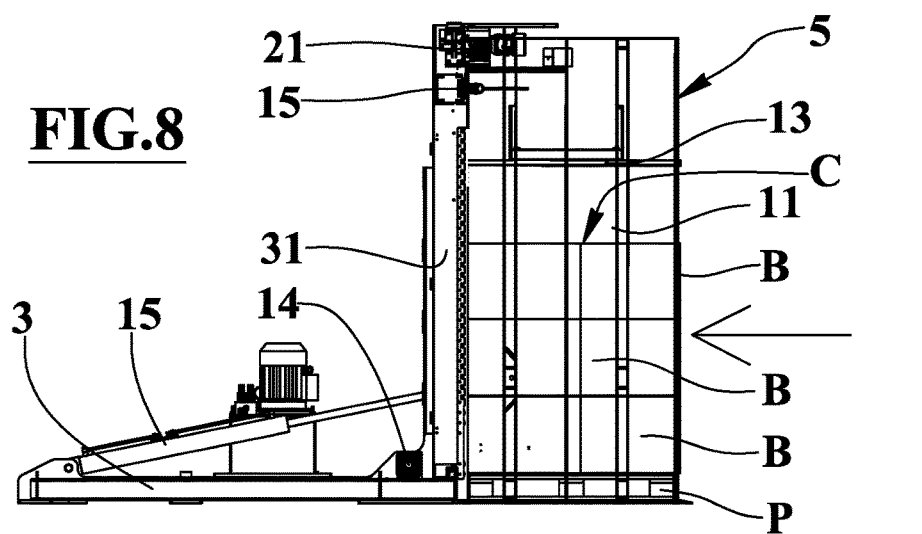
FIGS. 8-14 illustrate schematic views of the machine in FIG. 1 associated with a load consisting of several layers of packages and one or two pallets in a first possible operating sequence in which the movement of some layers of packages occurs by gravity.
Figure 9:
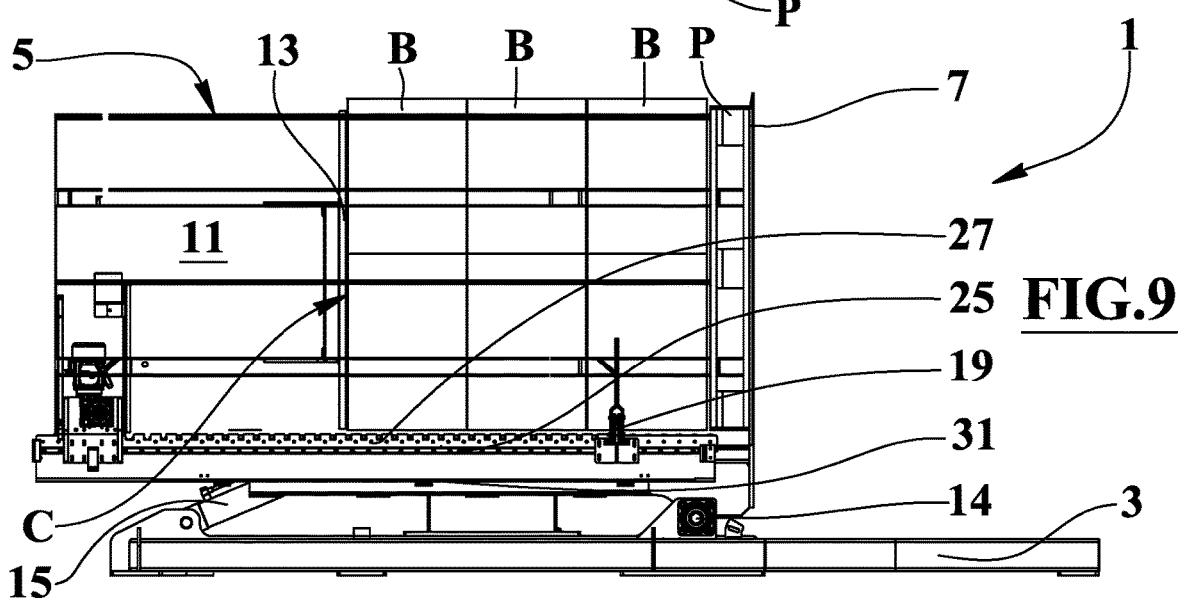
Figure 10:
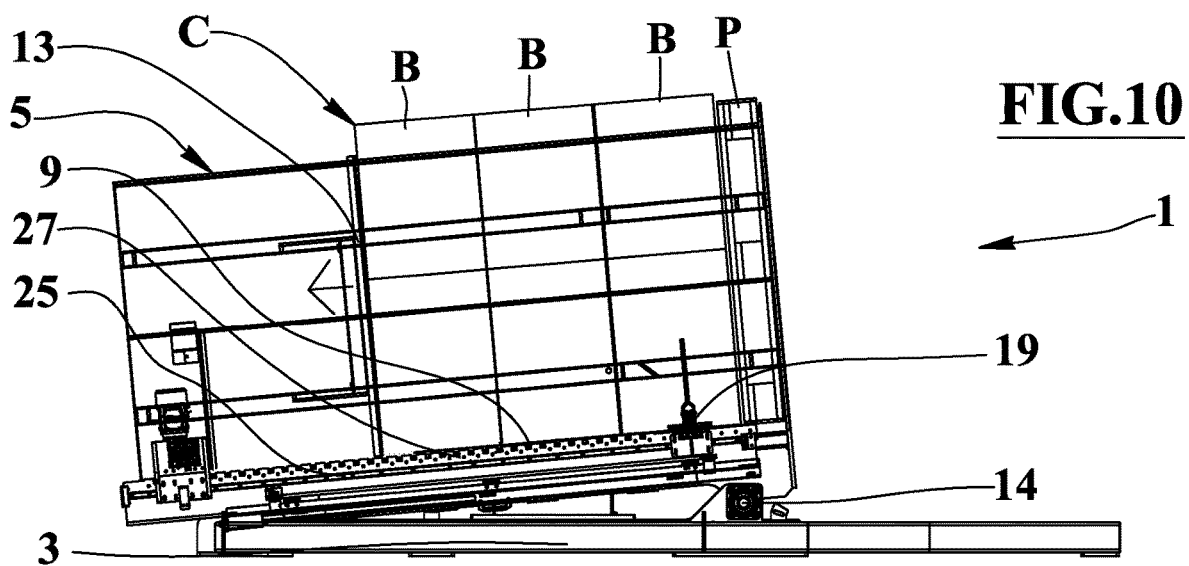
Figure 11:
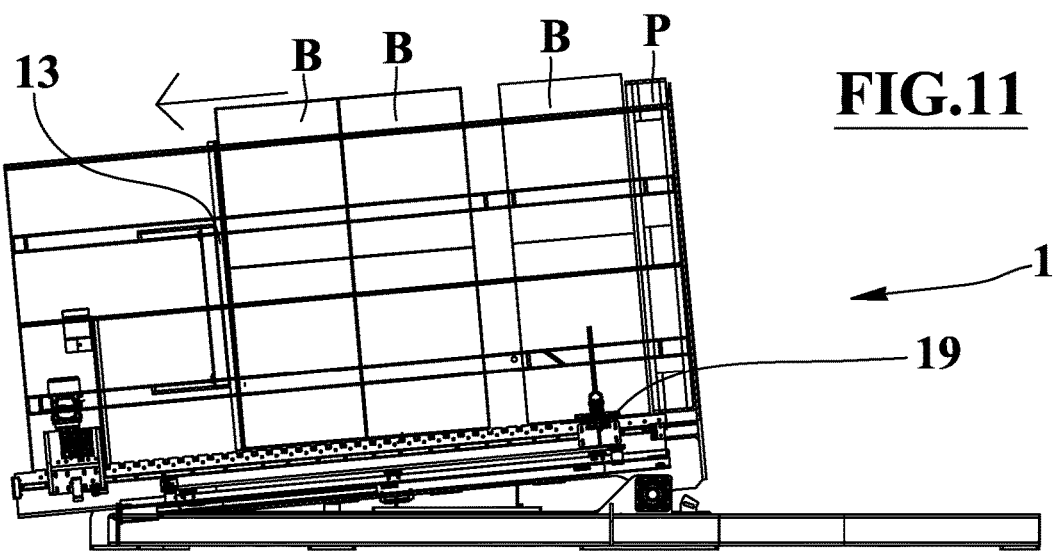
Figure 12:
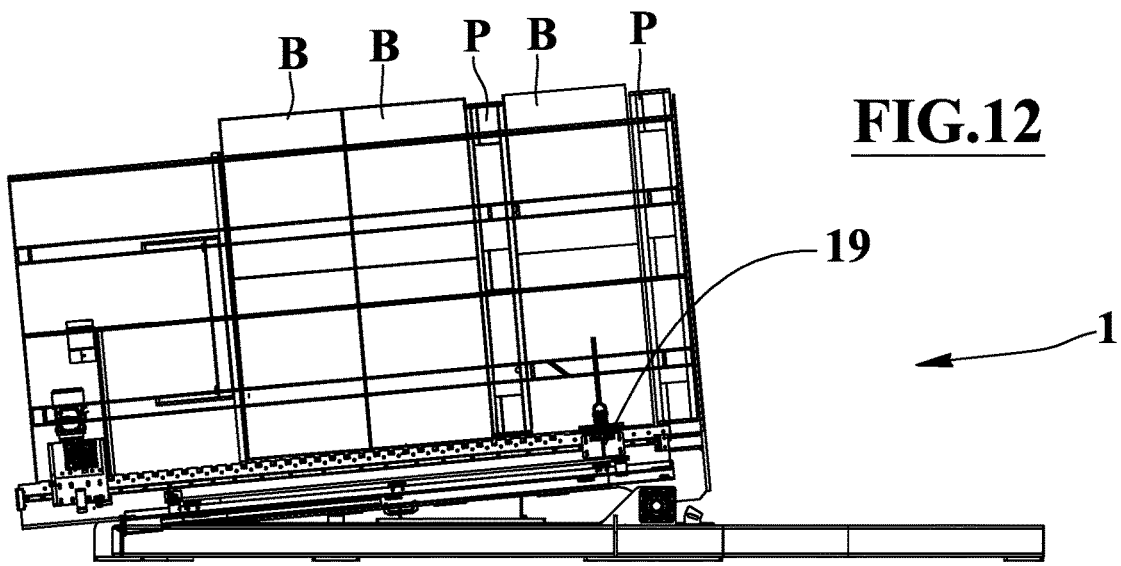
Figure 13:
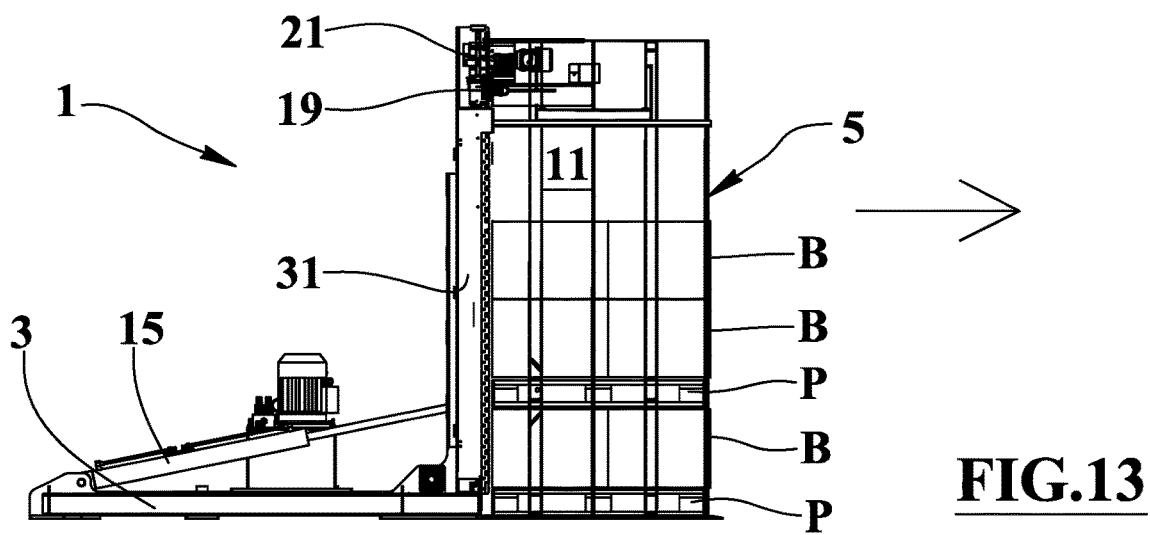

The possibility of rotating the housing element 5, and in particular the slide wall 9, by an angle greater than 90° (as illustrated in FIGS. 8-13) provides, for instance, an aid to the translation of the load part to be separated which helps the rotation member in some cases, for example when the surface of the load packages is smooth or slippery and the operable rolling means 10 of the rotation member 21 can slip on them. Said possibility, of rotation of more than 90°, allows or helps the separation of the load even if the rotation member 21 is not part of the machine.

The stop member 19 is fixed to a side of the slide wall member 9 or it 19 can be moved and locked along the slide wall member 9.

In the first case, the stop member 19 is fixed to a frame of the slide wall member 9; in the second case the stop member 19 slides along said rail member 25 and/or to said rack member 27 or along a respective rail member and/or a respective rack member.

The stop member 19 is provided with an operating lever acting on a blocking element thereof. If the stop member 19 is fixed, the operating lever acting and the respective blocking element are assigned to release and to block at least one rolling element 10 at a time. If the stop member 19 is sliding along the slide wall member 9 frame, the operating lever and the respective blocking element are assigned to release and to block at the same time one or more rolling elements 10 and the sliding of the stop member 19 itself.

Figure 14:
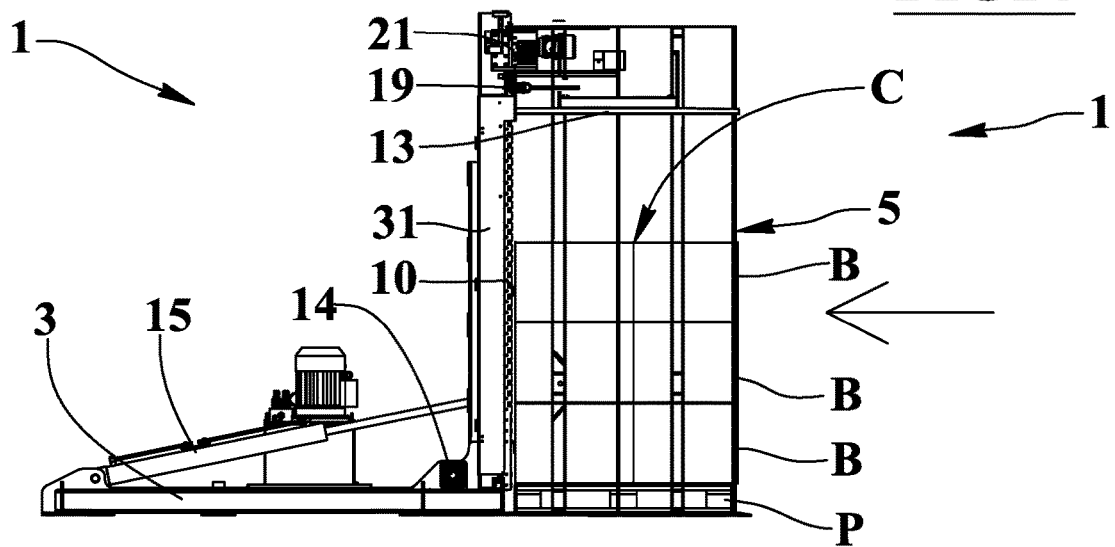
Figure 15:
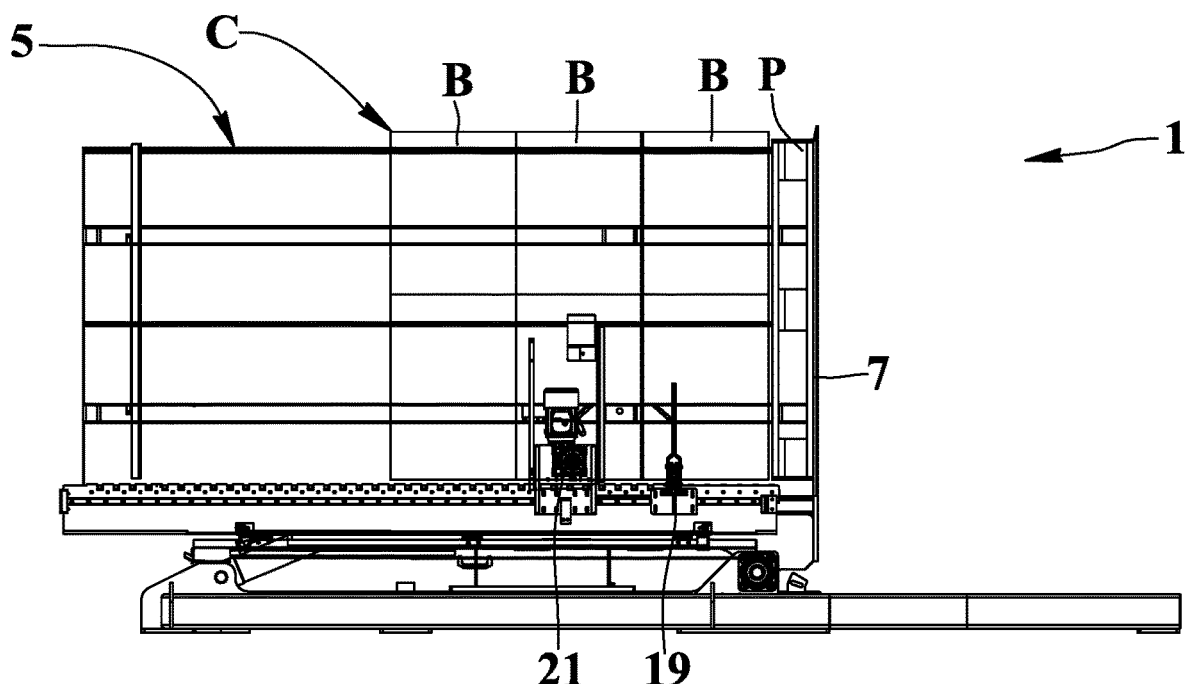
Figure 16:
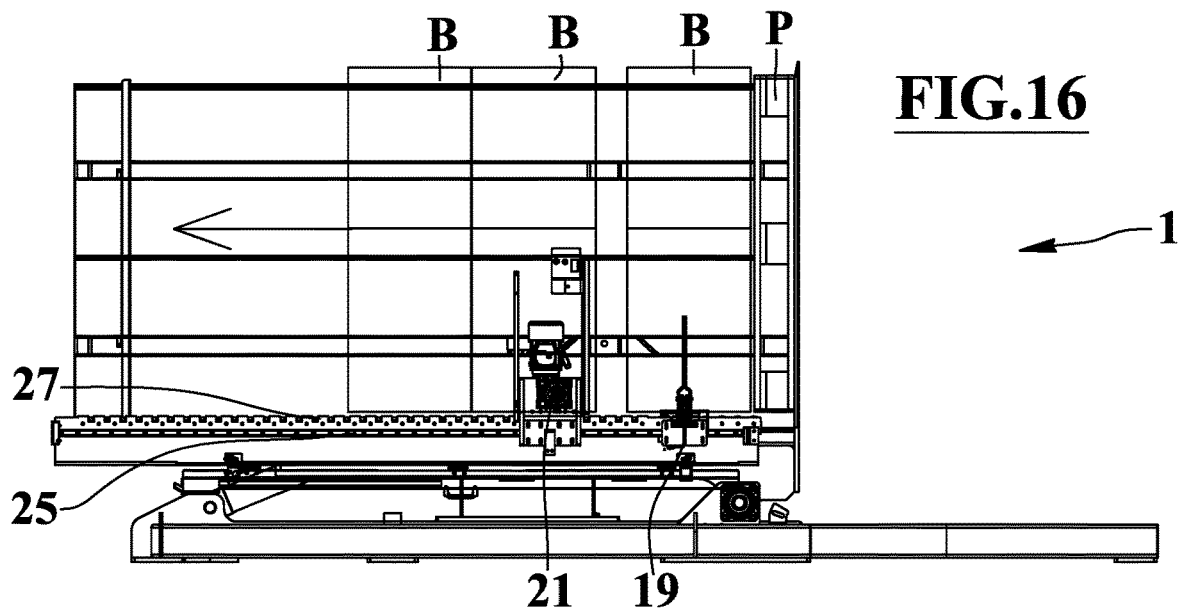
Figure 17:
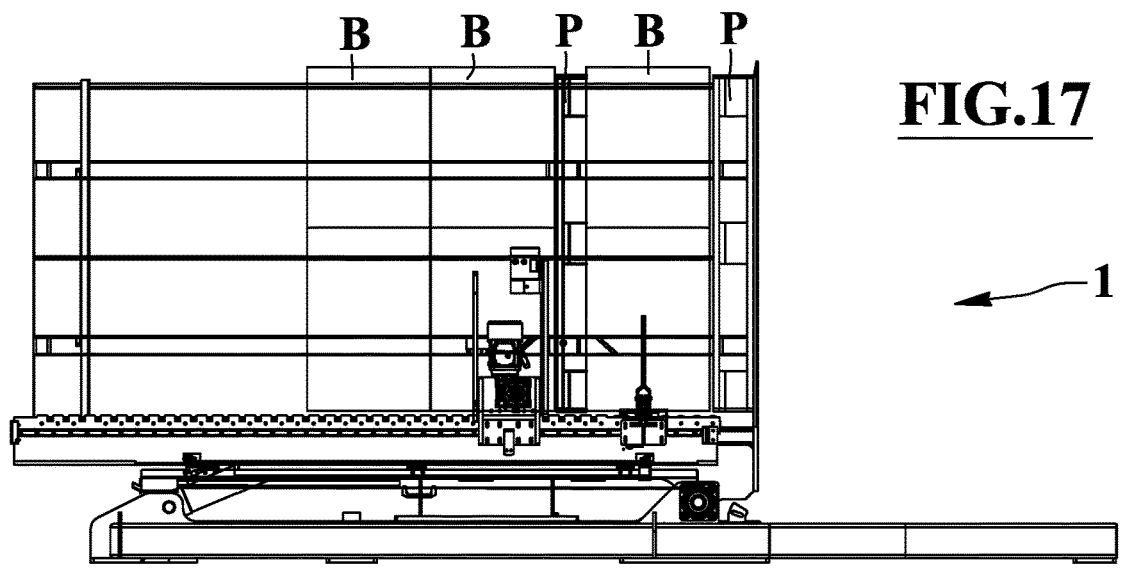
Figure 18:
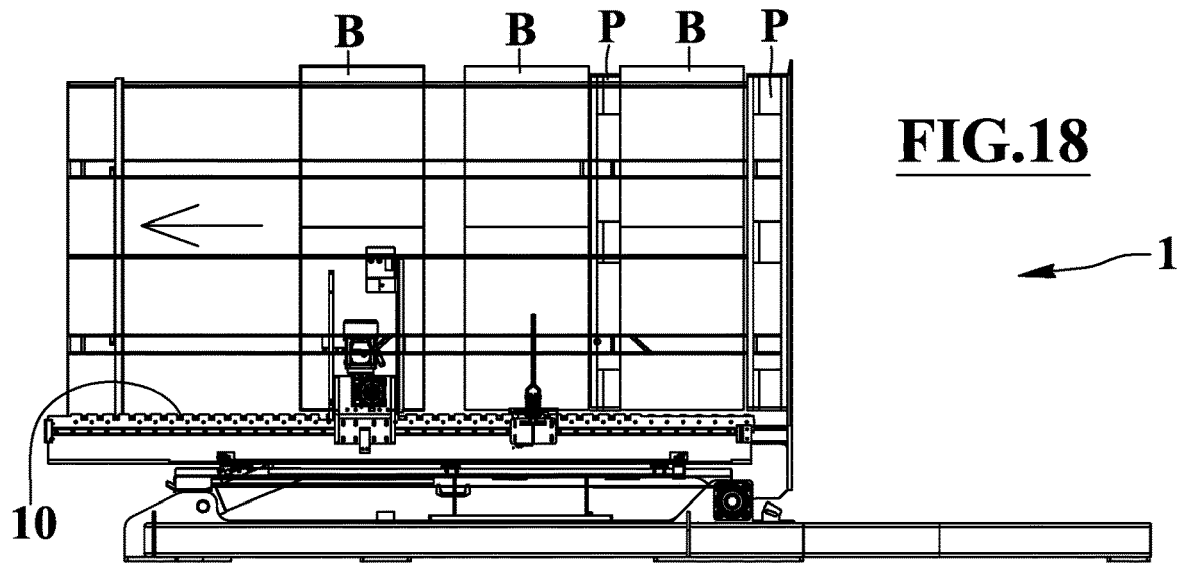
Figure 19:
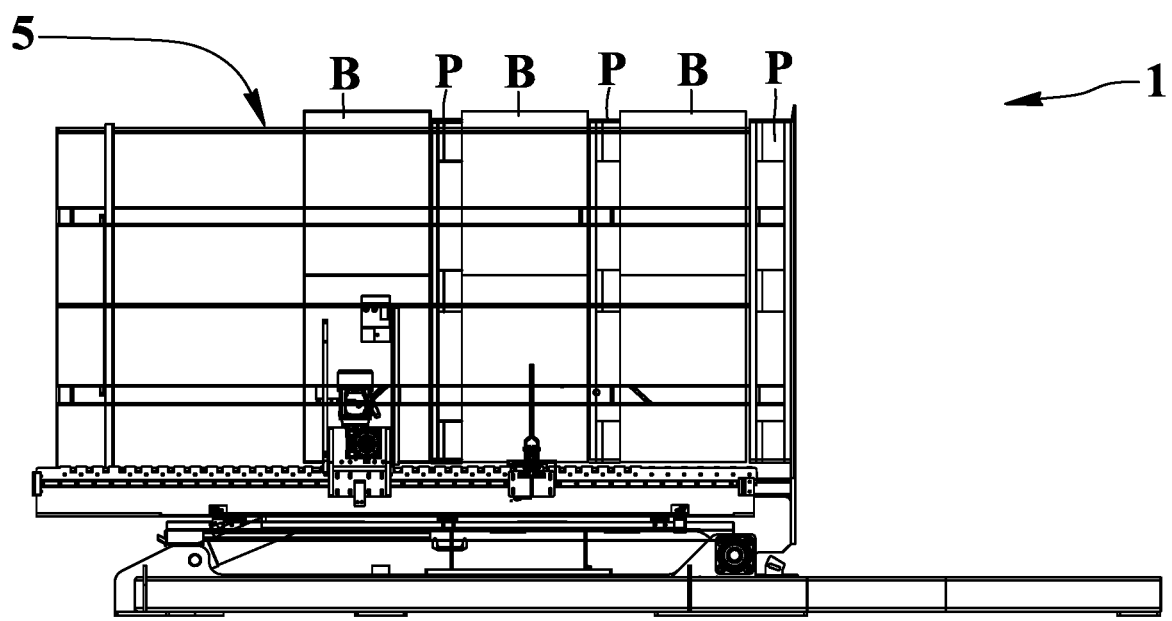
Figure 20:
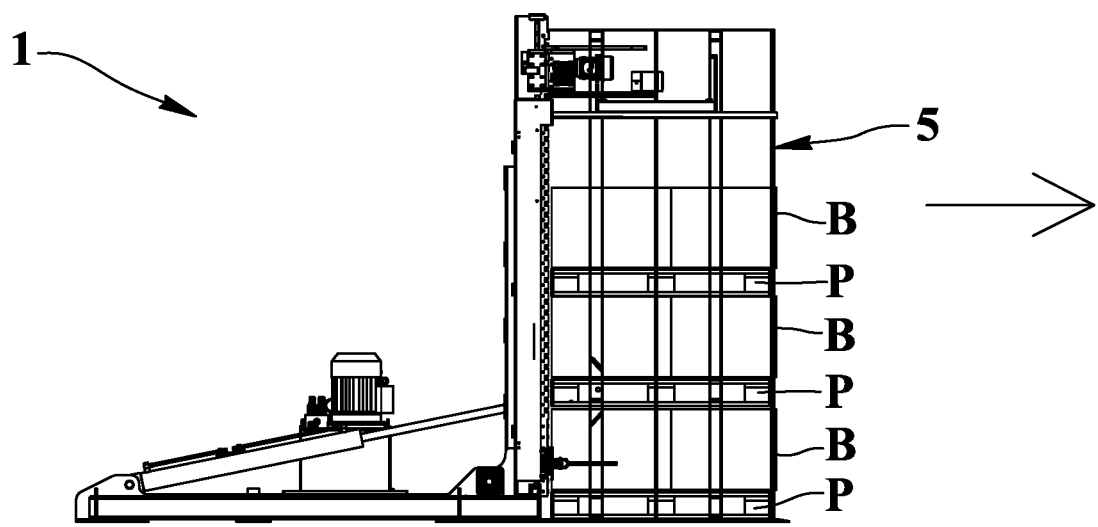

As illustrated in the schematic FIGS. 14-20 which represent a possible operating sequence of the machine comprising both the rotation member 21 and the stop member 19, the rotation member 21 allows to separate the layers of packages B to be separated from those blocked by the stop member 19 even when the housing element 5 in the second extreme condition is inclined by an angle between 80° and 90° or approximately 90°. This allows, for example, to separate layers of packages containing products that cannot be inclined beyond 80° or 90°.

Alternatively, and as seen, the roller conveyor can be of the type with totally idle or motorized rollers that can be operated individually or in groups. It is provided as a further alternative that possible electrically lockable and rotatable rollers can replace both the stop member 19 and the rotation member 21 as above described.

For an easy positioning of the stop member 19 and/or of the rotation member 21, a side perpendicular to the pivot pin 14 of the slide wall member 9 is provided with the rail member 25 of the balls circulation type which extends along such side perpendicular to the rotation axes of the rollers and of the pivot pin 14 and parallel to the side wall member 11. The stop member 19 is provided with its own carriage slidingly movable along the rail member 25 and is furthermore provided with said operating lever for its blocking elements assigned to release and block at least one roller at a time, blocking the roller itself and the sliding of the stop member 19 itself where such blocking element can act directly on the ends of the rollers or on their pinions (if they are provided with them), and is complementary shaped in respect to said ends or pinions.

The rotation member 21 is provided with a respective carriage slidably movable along the rail member 25 and its respective blocking lever is provided with one or more tooth shaped complementarily to the recesses of the rack member 27 to release and block the sliding of the rotation member 21 itself, positioning it where necessary and allowing it to impart the necessary force, or torque, to the rollers engaged to it without excessive clearance.

The side of the slide wall member 9 provided with the rail 25 and rack 27 members is also provided with a rotatable covering member 31, around hinge pins parallel to the rail member 25, between a working condition, in which does not interfere with the stop 19, rotation 21 and rail 25 members, and a rest condition in which it partially covers the rail member 25 and locks the stop member 19 and rotation member 21 in a position opposite the pivot pin 14 preventing them from sliding at least in the first extreme condition. The covering element will be placed in the non-interference condition before positioning the stop 19 and rotation 21 members.

The side wall member 11 is provided with at least one guide, preferably two, perpendicular to the geometric plane of the base member 7 and parallel to the geometric plane of the slide wall member 9 for the translation of one or more support brackets of the compacting plane member 13, translated along the slide wall member by a translation means; alternatively, the side wall member 11 is furthermore provided with a linear actuator, for example of a linear type with a hydraulic cylinder operated by a respective electric pump or, by means of a hydraulic control unit, by the same pump of the tilt actuator 15, with direction of action parallel to the at least one guide and connected to one or more support brackets for the translation of the compacting plane member 13.

The machine 1 can comprise at least position sensors of the compacting plane members 13, of the stop 19 and rotation 21 members, sensors of the status of the covering element 31, of the possible hydraulic control unit, of the levers of the stop 19 and rotation 21 members and it 1 can further comprise at least one rotation angle detector of the housing element 5, height and/or dimensions detectors of the load with and/or without a pallet. Such sensors and detectors can be used to provide data on the status of the machine to an operator.

The machine 1 can furthermore comprise a control means of the programmable digital type connected to the sensors and detectors and assigned to operate or enable the manual operation of the motors, gearmotors and actuators of the machine 1. The control means includes a non-transitory computer readable medium that stores a computer program in the form of code written according to a programming language for the aforesaid operation of the machine 1.

It is noted that the separation of layers of the load can be utilized not only for the insertion of pallets but also for other purposes such as, for example, to insert sheets or other elements for stabilizing and strengthening the load, to insert separators or other additional packages.

As set forth in full in the abstract before being truncated to a hundred and fifty words or less, an exemplary machine is shown for separating a load (C) made up of several superimposed layers of packages (B) and supported by a pallet (P), and the machine (1) comprises: a base element (3) assigned to be placed on a floor or plane and connected to a housing element (5) for the pallet (P) with the load (C) to be divided; a base member (7) assigned to meet with the face of the pallet (P) opposite to the load (C); a slide wall member (9) assigned to slide into contact with a lateral face of the load (C) of the pallet (P); a side wall member (11); a compacting plane member (13) slidably operated along the side wall member (11) towards and away from the base member (7) to which it is parallel. The base (7), slide wall (9) and side wall (11) members are mutually perpendicular. An edge of the housing element (5) is connected to the base element (3) by means of a rotation pin (14) parallel to such base (7) and slide wall (9) members. A tilt actuator (15) interconnected between the base (3) and housing (5) elements is assigned to rotate the housing element (5) around the pivot pin (14) between a first extreme condition wherein at least the slide wall member (9) is vertical and a second extreme condition wherein the housing member (5) is rotated by an angle of approximately 90° or by an angle greater than 90° with respect to the first extreme condition.

The invention claimed is:

1. A machine for separating a load (C) made up of several superimposed layers of packages (B) and supported by a pallet (P); said machine (1) comprising:
   a base element (3) for placement on, or fixed to, a floor, surface or wall;
   a base member (7) defining a respective plane configured to meet with a face of the pallet (P) opposite to the load (C);
   a slide wall member (9) provided with a set of rollers (10) with respective rotation axes perpendicular to a sliding direction and defining a respective plane assigned to match in a slidable way with a lateral face of the load (C), wherein such sliding direction and plane are perpendicular to the base member (7);
   a pivot pin (14) perpendicular to said sliding direction, parallel to the base member (7) and to the slide wall member (9) and placed therebetween and the base element (3) for enabling rotation of said base member (7) and slide wall member (9); and
   a tilt actuator (15) interconnected between the base element (3) and said base member (7) and slide wall member (9) to rotate said base member (7) and slide wall member (9) around the pivot pin (14),
   wherein the slide wall member (9) comprises at least one rotation member (21) provided with at least one motor or at least one gearmotor for motorized rotation of at least a subset of the rollers.

2. The machine according to claim 1, wherein the rotation member (21) is movable and lockable along one side of the slide wall member (9) for the rotation of said at least a subset of the rollers (10).

3. The machine according to claim 1, wherein the rotation member (21) is provided with a motor or gearmotor (16) having a drive pinion (18) for an annular belt or chain (20) engaged on respective free pinions (22) and on rotation pinions (24) of two or more adjacent rollers (10) of the slide wall (9).

4. The machine according to claim 1, wherein each roller, or each subset of rollers, is provided with a motor or gearmotor of the rotation member (21) for effecting rotation thereof, wherein each motor or gearmotor is operable individually or in groups.

5. The machine according to claim 1, further comprising a side wall member (11) defining a respective plane perpendicular to the base member (7) and to the slide wall member (9) and fixed laterally to said slide wall member (9).

6. The machine according to claim 5, further comprising a compacting plane member (13) defining a respective plane parallel to the base member (7) and slidably operable along the side wall member (11) towards and away from the base member (7) by translation means, or the side wall member (11) is provided with at least one guide perpendicular to a geometric plane of the base member (7) for enabling a sliding of one or more support brackets of the compacting plane member (13) and is further provided with a linear actuator with direction of action parallel to the at least one guide and connected to the one or more support brackets for translation of the compacting plane member (13).

7. The machine according to claim 6, wherein the base member (7), the slide wall member (9), the side wall member (11) and the compacting plane member (13) delimit a housing element (5) at least for the pallet (P) and its load (C).

8. The machine according to claim 1, wherein the slide wall member (9) is provided with at least one rail member (25) and at least one rack member (27) parallel and adjacent or fixed to a side of the slide wall member (9) perpendicular to the pivot pin (14), where the rotation member (21) is slidably movable along the rail member (25) and it is provided with a respective locking lever having a tooth, said locking lever operable to disengage and engage the tooth with one of a plurality of recesses of the rack member (27) to release and block sliding of the rotation member (21) and to engage the rotation member (21) with a corresponding subset of rollers (10).

9. A machine (1) for separating a load (C) made up of several superimposed layers of packages (B) and supported by a pallet (P); said machine (1) comprising:
   a base element (3) for placement on, or fixed to, a floor, surface or wall;
   a base member (7) defining a respective plane configured to meet with a face of the pallet (P) opposite to the load (C);
   a slide wall member (9) provided with a set of rollers (10) with respective rotation axes perpendicular to a sliding direction and defining a respective plane assigned to match in a slidable way with a lateral face of the load (C), wherein such sliding direction and plane are perpendicular to the base member (7);
   a pivot pin (14) perpendicular to said sliding direction, parallel to the base member (7) and to the slide wall member (9) and placed therebetween and the base element (3) for enabling rotation of said base member (7) and slide wall member (9); and
   a tilt actuator (15) interconnected between the base element (3) and said base member (7) and slide wall member (9) to rotate said base member and the slide wall member (9) around the pivot pin (14),
   said machine (1) further comprising at least one stop member (19) for blocking and releasing a corresponding subset of rollers (10), where said stop member (19) is fixed to a side of the slide wall member (9) or said stop member (19) is movable and lockable along the slide wall member (9).

10. The machine according to claim 9, further comprising at least one rail member (25) and at least one rack member (27) parallel and adjacent or fixed to a side of the slide wall member (9) perpendicular to the pivot pin (14), and wherein the stop member (19) is provided with an operating lever for a blocking element thereof configured to release and to block at least one roller (10) at a time; wherein the stop member is configured to slide along said rail member (25), or along said rack member (27), or along both.

11. The machine according to claim 9, further comprising a side wall member (11) defining a respective plane perpendicular to the base member (7) and to the slide wall member (9) and fixed laterally to said slide wall member (9).

12. The machine according to claim 11, further comprising a compacting plane member (13) defining a respective plane parallel to the base member (7) and slidably operable along the side wall member (11) towards and away from the base member (7) by translation means, or the side wall member (11) is provided with at least one guide perpendicular to the geometric plane of the base member (7) for enabling a sliding of one or more support brackets of the compacting plane member (13) and is further provided with a linear actuator with direction of action parallel to the at least one guide and connected to the one or more support brackets for translation of the compacting plane member (13).

13. A machine for separating a load (C) made up of several superimposed layers of packages (B) and supported by a pallet (P); said machine (1) comprising:

a base element (3) for placement on, or fixed to, a floor, surface or wall;

a base member (7) defining a respective plane configured to meet with a face of the pallet (P) opposite to the load (C);

a slide wall member (9) provided with a set of rollers (10) with respective rotation axes perpendicular to a sliding direction and defining a respective plane assigned to match in a slidable way with a lateral face of the load (C), wherein such sliding direction and plane are perpendicular to the base member (7);

a pivot pin (14) perpendicular to said sliding direction, parallel to the base member (7) and to the slide wall member (9) and placed therebetween and the base element (3) for enabling rotation of said base member (7) and slide wall member (9);

a tilt actuator (15) interconnected between the base element (3) and said base member (7) and slide wall member (9) to rotate said base member (7) and slide wall member (9) around the pivot pin (14);

wherein the slide wall member (9) comprises:

at least one rotation member (21) provided with at least one motor or at least one gearmotor for motorized rotation of at least a subset of the rollers; and at least one stop member (19) for blocking and releasing a corresponding subset of rollers (10), where said stop member (19) is fixed to a side of the slide wall member (9), or said stop member (19) is movable and lockable along the slide wall member (9).

14. The machine according to claim 13, wherein the slide wall member (9) is provided with at least one rail member (25) and at least one rack member (27) parallel and adjacent or fixed to a side of the slide wall member (9) perpendicular to the pivot pin (14), and wherein the stop member (19) is provided with an operating lever for a blocking element thereof assigned to release and to block at least one roller (10) at a time, wherein the stop member is fixed to the slide wall member (9) or it slides along said rail member (25), along said rack member (27), or both.

15. The machine according to claim 14, wherein a side of the slide wall member (9) is provided with a covering element (31) rotating between a working condition without interfering with the stop (19), rotation member (21) and rail member (25), and a rest condition for partially covering the rail member (25) and blocking the stop member (19) and rotation member (21) in a position opposite to the pivot pin (14).

16. The machine according to claim 13, further comprising a side wall member (11) defining a respective plane perpendicular to the base member (7) and to the slide wall member (9) and fixed laterally to said slide wall member (9), where the side wall member (11) is provided with at least one guide perpendicular to a geometric plane of the base member (7) for enabling a sliding of one or more support brackets of a compacting plane member (13) parallel to the base member (7) and slidably operated along the side wall member (11) towards and away from the base member (7), and where the side wall member (11) is further provided with a linear actuator with direction of action parallel to the at least one guide and connected to one or more support brackets for translation of the compacting plane member (13).

17. The machine according to claim 16, further comprising position sensors for providing sensed signals having magnitudes indicative of respective positions of the compacting plane member (13), of the stop member (19) and of the rotation member (21), status sensors for providing sensed status signals indicative of status of the covering element (31), status of the levers of the stop member (19), and status of the rotation member (21), and comprising at least one of rotation angle detector of the slide wall member (9) for providing a slide wall member angle signal having a magnitude indicative of the angle of the slide wall member, and a detector of the height of the load for providing a load height signal having a magnitude indicative thereof.

18. The machine according to claim 17, further comprising programmable digital control means including a non-transitory computer readable medium storing program instructions, the control means connected directly or indirectly to one or more of the sensors, the detectors, or both the sensors and detectors and responsive to sensed and detected signals therefrom for operating or enabling manual operation of actuators of the machine (1) by executing the stored program instructions.

19. The machine according to claim 13, wherein the rotation member (21) is movable and lockable along the side of the slide wall member (9) for the rotation of at least a subset of rollers (10).

20. The machine according to claim 13, wherein the rollers (10) of the slide wall (9) consist of rollers and the rotation member (21) is provided with a motor or gearmotor (16) having a drive pinion (18) for an annular belt or chain (20) engaged on respective free pinions (22) and on rotation pinions (24) of two or more adjacent rollers (10) of the slide wall (9).

* * * * *